US009932865B2

(12) United States Patent
Tadokoro et al.

(10) Patent No.: US 9,932,865 B2
(45) Date of Patent: Apr. 3, 2018

(54) VALVE TIMING CONTROL DEVICE FOR INTERNAL COMBUSTION ENGINE

(71) Applicant: HITACHI AUTOMOTIVE SYSTEMS, LTD., Hitachinaka-shi, Ibaraki (JP)

(72) Inventors: Ryo Tadokoro, Hadano (JP); Atsushi Yamanaka, Atsugi (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 84 days.

(21) Appl. No.: 15/109,924

(22) PCT Filed: Jan. 14, 2015

(86) PCT No.: PCT/JP2015/050744
§ 371 (c)(1),
(2) Date: Jul. 6, 2016

(87) PCT Pub. No.: WO2015/118915
PCT Pub. Date: Aug. 13, 2015

(65) Prior Publication Data
US 2016/0326917 A1 Nov. 10, 2016

(30) Foreign Application Priority Data
Feb. 6, 2014 (JP) .................................. 2014-020864

(51) Int. Cl.
| F01L 1/46 | (2006.01) |
| F01L 1/34 | (2006.01) |
| F01L 1/352 | (2006.01) |
| H02K 13/00 | (2006.01) |

(Continued)

(52) U.S. Cl.
CPC ................. *F01L 1/34* (2013.01); *F01L 1/352* (2013.01); *H02K 13/003* (2013.01); *F01L 1/344* (2013.01); *F01L 1/46* (2013.01); *F01L 2001/3522* (2013.01); *F01L 2013/103* (2013.01); *F01L 2101/00* (2013.01); *F01L 2250/02* (2013.01); *F01L 2820/032* (2013.01)

(58) Field of Classification Search
CPC ....... F01L 1/344; F01L 1/46; F01L 2013/103; F01L 2820/032
USPC ..................................................... 123/90.15
See application file for complete search history.

(56) References Cited

U.S. PATENT DOCUMENTS
2012/0312259 A1   12/2012   Yamanaka et al.

FOREIGN PATENT DOCUMENTS
| JP | 2012-251537 A | 12/2012 |
| JP | 2013-036400 A | 2/2013 |

*Primary Examiner* — Jorge Leon, Jr.
(74) *Attorney, Agent, or Firm* — Foley & Lardner LLP (57) ABSTRACT

A valve timing control device for an internal combustion engine includes: a driving rotation member; a driven rotation member fixed to a cam shaft; an electric motor; a speed reduction mechanism; a power feeding brush; and a power feeding plate which is provided to the driving rotation member, and which includes a slip ring on which the power feeding brush is abutted, the power feeding plate including a rigidity plate portion whose outer circumference portion is fixed to the driving rotation member, and a resin portion formed by molding an outer surface of the rigidity plate portion, and the rigidity plate portion including a holding hole which holds the power feeding brush through the resin portion, and being integrally formed with a reinforcement portion which is formed at a portion except for the holding hole, and which extends in a radially inward direction.

19 Claims, 8 Drawing Sheets

(51) Int. Cl.
*F01L 13/00* (2006.01)
*F01L 1/344* (2006.01)

VALVE TIMING CONTROL DEVICE FOR INTERNAL COMBUSTION ENGINE

TECHNICAL FIELD

This invention relates to a valve timing control device for an internal combustion engine which is configured to control an opening timing and a closing timing of an intake valve and an exhaust valve.

BACKGROUND ART

There is known a patent document 1 previously filed by the applicant, as a valve timing control device for an internal combustion engine.

In this valve timing control device, a power feeding plate (power feeding mechanism) configured to feed the power to a coil of an electric motor is provided at a front end portion of a cylindrical motor housing which is fixed at an axial one end portion of a timing sprocket to which a rotational force is transmitted from a crank shaft.

This power feeding plate includes a metal plate portion which is formed into an annular shape, and a resin portion molded on both side portions of front and rear portions of the metal plate portion.

An outer circumference portion of the metal plate portion is caulked and fixed to the front end portion of the motor housing. Two switching brushes arranged to be slidably abutted on a commutator are held on the inner side surface side of the metal plate portion through the resin portion. On the other hand, two slip rings on which the power feeding brushes are slidably abutted from the axial direction are fixed on the outer side surface side of the resin portion.

The current supplied from the battery power supply is supplied to the electric motor by using the power feeding brushes and the slip rings, and the switching brushes and the commutator when the valve timing is varied. The rotational force of the electric motor is transmitted through the speed reduction mechanism to the cam shaft. With this, a relative rotational phase of the cam shaft with respect to the timing sprocket is converted, so that opening timing and closing timing of intake valves and exhaust valves are controlled.

PRIOR ART DOCUMENT

Patent Document

Patent Document 1: Japanese Patent Application Publication No. 2013-36400.

SUMMARY OF THE INVENTION

Problems which the Invention is Intended to Solve

However, in the valve timing control device of the patent document 1, the metal plate portion has the annular shape having a small radial width. Accordingly, it is not possible to obtain a sufficient entire strength. When the outer circumference portion is caulked and fixed on the front end portion of the motor housing, the metal plate portion is easy to be slightly deflected and deformed (flexural deformation) by this load stress.

Accordingly, the flatness of the slip rings fixed to the resin portion is decreased. The smooth slidability between the slip rings and the power feeding brushes may not obtained.

It is, therefore, an object of the present invention to provide a valve timing control device for an internal combustion engine which is devised to solve the above-mentioned problems, to ensure the strength of the rigidity plate portion, and to suppress the decrease of the flatness of the slip ring.

Means for Solving the Problem

The invention described in claim 1 of the present application is characterized in that the power feeding plate is formed into a disc shape, the power feeding plate including a rigidity plate portion whose an outer circumference portion is fixed to the driving rotation member, and a resin portion is formed by molding an outer surface of the rigidity plate portion, and the rigidity plate portion includes a holding hole which is formed to penetrate, and which holds the power feeding brush through the resin portion, the rigidity plate portion being integrally formed with a reinforcement portion which is formed at a portion except for the holding hole, and which extends in a radially inward direction. The resin portion is molded on both side surfaces of the rigidity plate portion; and the resin portion is configured to hold the slip ring on an outer side surface of the resin portion

Benefit of the Invention

According to the present invention, it is possible to sufficiently ensure the strength of the rigidity plate portion by the reinforcement portion, and thereby to suppress the decrease of the flatness of the slip ring.

DESCRIPTION OF EMBODIMENTS

Hereinafter, a valve timing control device for an internal combustion engine according to embodiments of the present invention are illustrated. Besides, in this embodiment, the valve timing control device is applied to the intake valve side.

Figure 1:
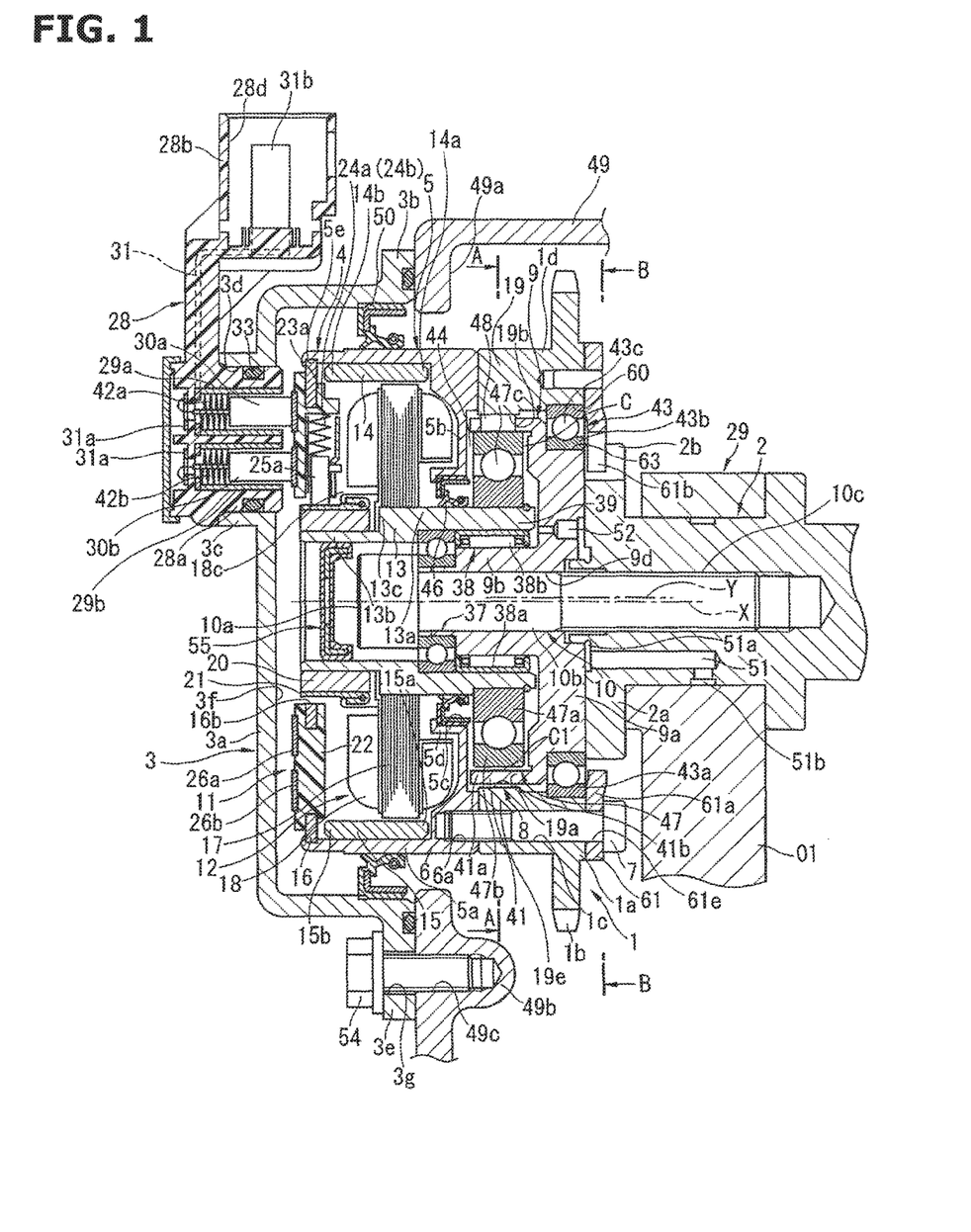
FIG. 1 is a longitudinal sectional view showing a valve timing control device according to a first embodiment of the present invention.
Figure 2:
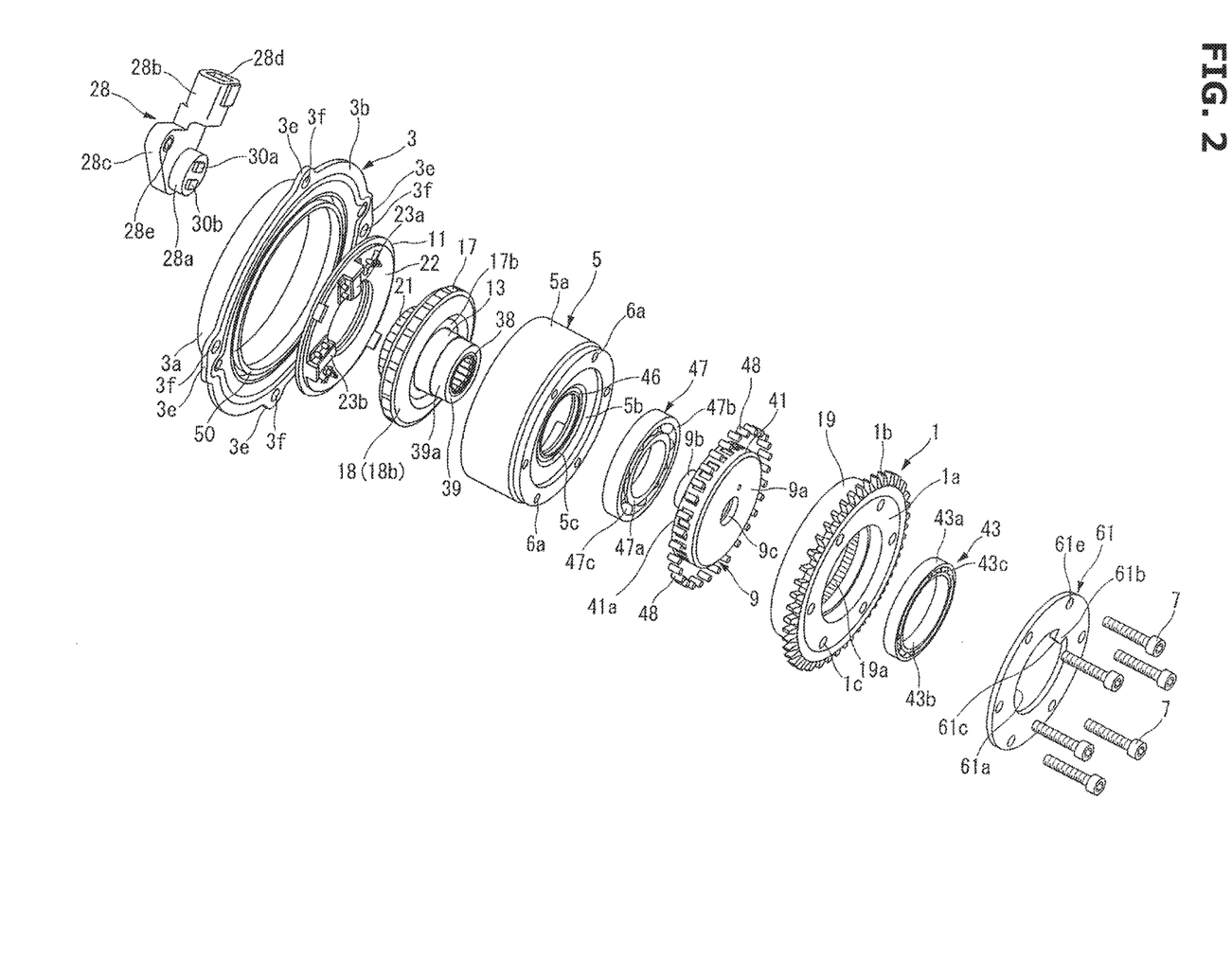
FIG. 2 is an exploded perspective view showing main constituting members in this embodiment.

As shown in FIG. 1 and FIG. 2, this valve timing control device includes a timing sprocket 1 which is a driving rotation member which is drivingly rotated by a crank shaft of the internal combustion engine; a cam shaft 2 which is rotatably supported through a bearing 02 on a cylinder head 01, and which is rotated by a rotational force transmitted from the timing sprocket 1; a cover member 3 fixed to a chain cover 49 disposed at a front position of the timing sprocket 1; and a phase varying mechanism 4 which is disposed between the timing sprocket 1 and the cam shaft 2, and which is arranged to vary a relative rotational phase between the timing sprocket 1 and the cam shaft 2 in accordance with a driving state of the engine.

An entire of the timing sprocket 1 is integrally made from iron series metal into an annular shape. The timing sprocket 1 includes a sprocket main body 1a which includes an inner circumference surface having a stepped shape; a gear portion 1b which is integrally provided on an outer circumference of the sprocket main body 1a, and which is arranged to receive the rotational force from the crank shaft through a wound timing chain (not shown); and an internal teeth constituting section 19 which is integrally provided on the front end side of the sprocket main body 1a.

Moreover, in this timing sprocket 1, a large diameter ball bearing 43 is disposed between the sprocket main body 1a and a driven member 9 (described later) provided at the front end portion of the cam shaft 2. The timing sprocket 1 and the cam shaft 2 are supported by this large diameter ball bearing 43 to be rotated relative to each other.

The large diameter ball bearing 43 includes an outer wheel 43a; an inner wheel 43b; and balls 43c disposed between the outer wheel 43a and the inner wheel 43b. The outer wheel 43a is fixed on an inner circumference side of the sprocket main body 1a. The inner wheel 43b is fixed on the outer circumference side of the driven member 9.

The sprocket main body 1a includes an outer wheel fixing portion 60 which is formed into an annular groove shape by cutting, which is formed on the inner circumference side of the sprocket main body 1a, and which is opened to the cam shaft 2's side.

This outer wheel fixing portion 60 is formed into a stepped shape. The outer wheel 43a of the large diameter ball bearing 43 is press-fit in the outer wheel fixing portion 60 from an axial direction, so as to position an axial one side of this outer wheel 43a.

The internal teeth constituting section 19 is integrally provided on the outer circumference side of the front end portion of the sprocket main body 1a. The internal teeth constituting section 19 is formed into a cylindrical shape extending in a forward direction toward the phase varying mechanism 4. The internal teeth constituting section 19 includes a plurality of internal teeth 19a which have a waveform shape.

Moreover, a female screw forming section 6 is disposed on the front end side of the internal teeth constituting section 19 to confront the front end side of the internal teeth constituting section 19. The female screw forming section 6 has an annular shape. The female screw forming section 6 is integral with a motor housing 5 (described later).

Moreover, there is provided an annular holding plate 61 which is disposed on a rear end portion of the sprocket main body 1a that is opposite to the internal teeth constituting section 19. This holding plate 61 is integrally made from the metal plate. As shown in FIG. 1, the holding plate 61 includes an outside diameter which is substantially identical to an outside diameter of the sprocket main body 1a, and an inside diameter which is smaller than an outside diameter of the outer wheel 43a of the large diameter ball bearing 43.

The holding plate 61 includes an inner circumference portion 61a which is disposed and abutted on an axial outer end surface of the outer wheel 43a of the large diameter ball bearing 43. Moreover, the holding plate 61 includes a stopper raised portion 61b which is integrally provided at a predetermined position of an inner circumference edge of the inner circumference portion 61a, and which protrudes in the radially inside direction, that is, toward the center axis.

Figure 4:
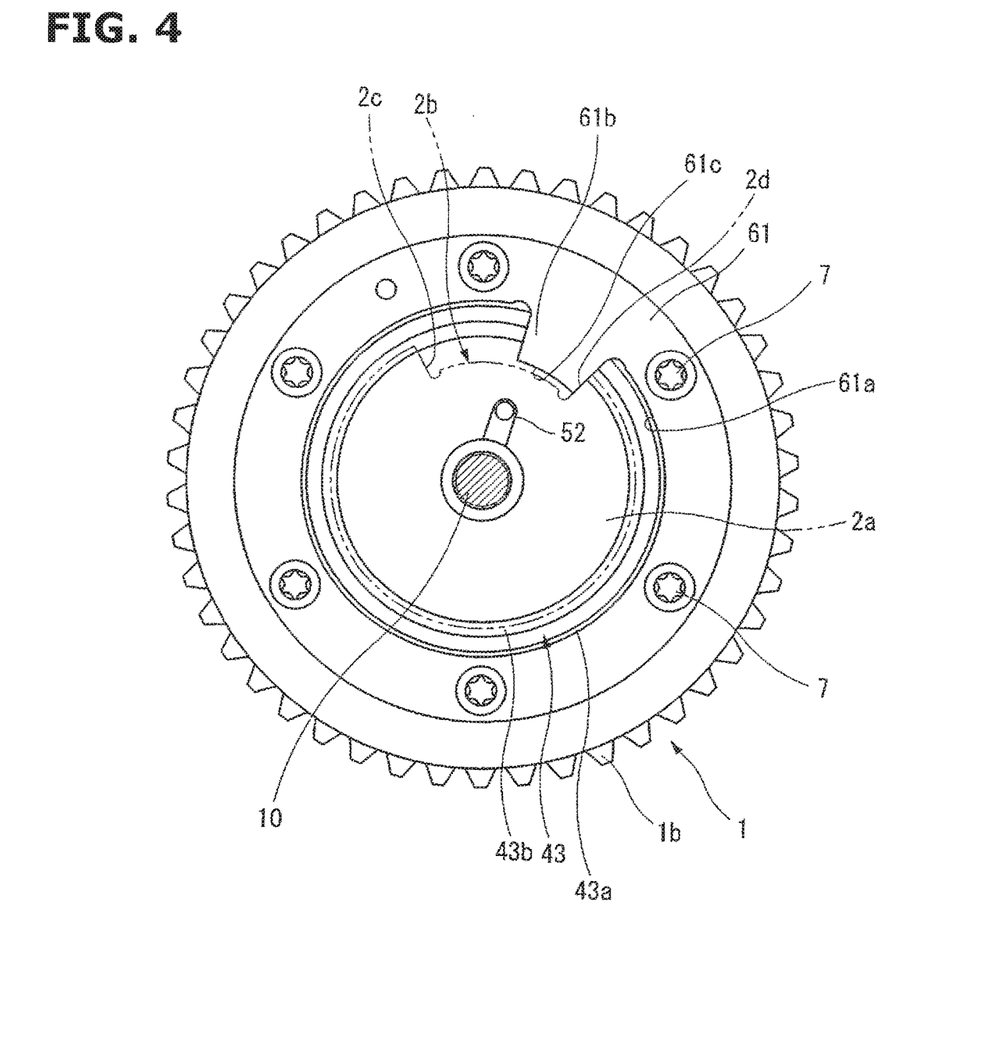
FIG. 4 is a sectional view taken along a section line B-B of FIG. 1.

As shown in FIG. 1 and FIG. 4, this stopper raised portion 61b is formed into a substantially sectorial shape. The stopper raised portion 61b includes a tip end edge 61c which is formed into an arc shape extending along an arc inner circumference surface of a stopper groove 2b (described later). Moreover, the holding plate 61 includes six bolt insertion holes 61d which are formed in an outer circumference portion of the holding plate 61, which are provided at a regular interval in the circumferential direction, which penetrate through the holding plate 61, and each of which a bolt 7 is inserted.

The sprocket main body is (the internal teeth constituting section 19) includes six bolt insertion holes is which are formed in the outer circumference portion of the sprocket main body 1a at a substantially regular interval in the circumferential direction, and which penetrate through the sprocket main body 1a. The holding plate 61 includes the six bolt insertion holes 61d which are formed in the outer circumference portion of the holding plate 61 at the substantially regular interval in the circumferential direction, and which penetrate through the holding plate 61. Moreover, the female screw forming section 6 includes six female screw holes 6a which are formed at positions corresponding to the bolt insertion holes 1c and 61d. The timing sprocket 1, the holding plate 61, and the motor housing 5 are fixed together from the axial direction by the six bolts inserted into these holes.

Besides, the sprocket main body 1a and the internal teeth constituting section 19 constituting a casing of a speed reduction mechanism 8 (described later).

Moreover, the sprocket main body 1a, the internal teeth constituting section 19, the holding plate 61, and the female screw forming section have a substantially identical outside diameter.

As shown in FIG. 1, the chain cover 49 is disposed and fixed on the front end side of the cylinder block (not shown) and the cylinder head 01 (engine main body) along in the upward and downward directions, so as to cover the chain (not shown) wound around the timing sprocket. The chain cover 49 includes an annular wall 49a which constitutes an opening formed at a position corresponding to the phase varying mechanism 4; boss portions 49b which are integrally formed at four circumferential positions of the annular wall 49a; and female screw holes 49c which are formed from the annular wall 49a to the inside of the boss portions 49b.

As shown in FIG. 1 and FIG. 2, the cover member 3 is integrally formed from the aluminum alloy material into a cup shape. The cover member 3 is disposed to cover the front end portion of the motor housing 5. The cover member 3 includes a cover main body 3a which has a protruding shape; and a mounting flange 3b which has an annular shape, and which is integrally formed on an outer circumference edge of the cover main body 3a on the opening's side. The cover main body 3a includes a cylindrical wall 3c which is integrally formed on the outer circumference portion of the cover main body 3a to extend in the axial direction. This cylindrical wall 3c has a short axial length. The cylindrical wall 3c includes a holding hole 3d which is formed within the cylindrical wall 3c.

The mounting flange 3b includes four boss portions 3e which are formed at substantially regular interval positions (about 90 degrees positions) in the circumferential direction. Each of the boss portions 3e includes a bolt insertion hole 3g through which the bolt 54 screwed into the female screw hole 49d formed in the chain cover 49 is inserted, and which penetrates through the boss portion 3e. The cover member 3 is fixed to the chain cover 49 by the bolts 54.

An oil seal 50 having a large diameter is disposed between the inner circumference surface of the stepped portion of the cover main body 3a on the radially outside and the outer circumference surface of the motor housing 5. This large diameter oil seal 50 has a substantially U-shaped transverse section. In this oil seal 50, a core metal is embedded inside the base material of the synthetic rubber. An annular base portion of the oil seal 50 on the radially outside is mounted and fixed on a stepped annular portion 3h provided on the inner circumference surface of the cover member 3.

As shown in FIG. 1, the motor housing 5 includes the housing main body 5a which is formed into a bottomed cylindrical shape by press-forming the iron series metal material; and a power feeding plate 11 which closes a front end opening of the housing main body 5a.

The housing main body 5a includes a separation wall 5b which has a circular plate shape, and which is disposed on a rear end side of the housing main body 5a; a large diameter hole 5c which has a large diameter, which is formed at a substantially central portion of the separation wall 5b, and through which an eccentric shaft portion 39 (described later) is inserted; and an elongating portion 5d which has a cylindrical shape, which is integrally provided on an edge of the large diameter hole 5c, and which protrudes in the axial direction of the cam shaft 2. Moreover, the female screw forming section 6 is integrally formed on the outer circumference side of the front end surface of the separation wall 5b.

The cam shaft 2 includes two drive cams which are provided to one of the cylinders, and which are provided on an outer circumference of the cam shaft 2, and each of which is arranged to open the intake valve (not shown); and the flange portion 2a integrally provided at the front end portion of the cam shaft 2.

As shown in FIG. 1, this flange portion 2a has an outside diameter which is slightly larger than an outside diameter of a fixing end portion 9a of the driven member 9 (described later), so that the outer circumference portion of the front end surface of the flange portion 2a is disposed and abutted on the axial outer end surface of the inner wheel 43b of the large diameter ball bearing 43 after the constituting components are assembled. Moreover, the flange portion 2a (the cam shaft 2) is connected to the driven member 9 by a cam bolt 10 in a state where the front end surface of the flange portion 2a is abutted on the driven member 9 in the axial direction.

Furthermore, as shown in FIG. 4, the flange portion 2a includes the stopper recessed groove 2b which is formed on the outer circumference of the flange portion 2a along the circumferential direction, and into which the stopper raised portion 61b of the holding plate 61 is engageably inserted. This stopper recessed groove 2b is formed into an arc shape having a predetermined circumferential length. The stopper raised portion 61b is arranged to be pivoted in a range of this circumferential length of the stopper recessed groove 2b. Both end circumferential edges of the stopper raised portion 61b are arranged to be abutted, respectively, on confronting circumferential edges 2c and 2d of the stopper recessed groove 2b, so as to restrict the relative rotational position of the cam shaft 2 on the maximum advance angle side or the maximum retard angle side with respect to the timing sprocket 1.

The stopper raised portion 61b is disposed at a position which is apart toward the cam shaft 2's side, relative to a portion of the holding plate 61 that is fixed to confront the outer wheel 43a of the large diameter ball bearing 43 from the axially outward direction. The stopper raised portion 61b is not contacted on the fixing end portion 9a of the driven member 9 in the axial direction. Accordingly, it is possible to sufficiently suppress the interference between the stopper raised portion 61b and the fixing end portion 9a.

As shown in FIG. 1, the cam bolt 10 includes a head portion 10a having an end surface which supports an inner wheel of a small ball bearing 37 from the axial direction; and a shaft portion 10b having an outer circumference which includes an external screw 10c that is screwed in the internal screw formed inside the cam shaft 2 from the end portion of the cam shaft 2 in the axial direction.

The driven member 9 is integrally made from the iron series metal. As shown in FIG. 1, the driven member 9 includes the fixing end portion 9a which has a circular plate shape, and which is formed on a rear end side (the cam shaft 2's side); a cylindrical portion 9b which protrudes from the front end surface of the inner circumference of the fixing end portion 9a in the axial direction; and a holding (retaining) device 41 which has a cylindrical shape, which is integrally formed on the outer circumference portion of the fixing end portion 9a, and which holds a plurality of rollers 48.

The fixing end portion 9a includes a rear end surface which is disposed and abutted on the front end surface of the flange portion 2a of the cam shaft 2. The fixing end portion 9a is fixed to the flange portion 2a by the pressure welding by the axial force of the cam bolt 10 in the axial direction.

As shown in FIG. 1, the cylindrical portion 9b includes an insertion hole 9d which is formed at a substantially central portion of the cylindrical portion 9b, which penetrates through the cylindrical portion 9b, and through which the shaft portion 10b of the cam bolt 10 is inserted. A needle bearing 38 which is a bearing member is provided on the outer circumference side of the cylindrical portion 9b.

As shown in FIG. 1, the holding device 41 has a section having a substantially L-shape by bending from the front end of the outer circumference portion of the fixing end portion 9a in the forward direction. The holding device 41 has a bottomed cylindrical shape protruding in a direction identical to that of the cylindrical portion 9b.

The cylindrical tip end portion 41a of the holding device 41 extends toward the separation wall 5b of the motor housing 5 through a receiving space 44 which has an annular recessed shape, and which is formed between the female screw forming section 6 and the elongating portion 5d. Moreover, as shown in FIG. 1 and FIG. 2, the cylindrical tip end portion 41a of the holding device 41 includes a plurality of roller holding holes 41b each of which has a substantially rectangular shape, which are formed at a regular interval in the circumferential direction, and each of which is arranged to hold one of the plurality of rollers 48 so that the rollers 48 are rolled. A number of the roller holding holes 41b (the rollers 48) is smaller than a number of the teeth of the internal teeth 19a of the internal teeth constituting section 19. With this, it is possible to obtain a speed reduction ratio.

The phase varying mechanism 4 includes the electric motor 12 disposed on the front end side of the cylindrical portion 9b of the driven member 9; and a speed reduction mechanism 8 arranged to reduce a rotation speed of the electric motor 12, and to transmit the reduced rotation speed to the cam shaft 2.

As shown in FIG. 1 and FIG. 2, the electric motor 12 is a DC motor with a brush. The electric motor 12 includes the motor housing 5 which is a yoke arranged to rotate as a unit with the timing sprocket 1; a motor output shaft 13 which is rotatably received within the motor housing 5; a pair of permanent magnets 14 and 15 each of which has a semi-arc shape, and which is a stator fixed on an inner circumference surface of the motor housing 5; and the power feeding plate 11.

The motor output shaft 13 serves as an armature. The motor output shaft 13 is formed into a stepped cylindrical shape. The motor output shaft 13 includes a stepped portion 13*c* which is formed at a substantially central portion of the motor output shaft 13 in the axial direction; a large diameter portion 13*a* which is positioned on the cam shaft 2's side of the stepped portion; and a small diameter portion 13*b* on a side of the stepped portion which is opposite to the large diameter portion 13*a*. An iron core rotor 17 is fixed on an outer circumference of the large diameter portion 13*a*. The eccentric shaft portion 39 constituting a part of the speed reduction mechanism 8 is integrally formed at the rear end portion of the large diameter portion 13*a*.

On the other hand, an annular member 20 is fixed on an outer circumference of the small diameter portion 13*b* by the press-fit. A commutator 21 is fixed on an outer circumference surface of the annular member 20 by the press-fit from the axial direction, and positioned in the axial direction by the outer surface of the stepped portion 13*c*. The annular member 20 has an outside diameter which is substantially identical to the outside diameter of the large diameter portion 13*a*. The annular member 20 has an axial length which is slightly smaller than that of the small diameter portion 13*b*.

A plug member 55 is fixed on the inner circumference surface of the small diameter portion 13*b* by the press-fit. The plug member 55 is configured to suppress the leakage of the lubricating oil which is supplied to the motor output shaft 13 and the eccentric shaft portion 39 to lubricate the bearings 37 and 38, to the outside.

The iron core rotor 17 is made from a magnetic material having a plurality of magnetic poles. The iron core rotor 17 includes an outer circumference portion which is a bobbin that has slots on which wire of coil 18 is wound.

On the other hand, the commutator 21 is made from conductive material into an annular shape. The commutator 21 includes segments which are obtained by dividing the commutator 21 by the number which is identical to the number of the poles of the iron core rotor 17, and to which terminals of the pulled-out wire of the coil 18 are electrically connected.

Each of the permanent magnets 14 and 15 has an overall cylindrical shape. Each of the permanent magnets 14 and 15 has the plurality of the magnetic poles in the circumferential direction. The permanent magnets 14 and 15 are positioned at axial positions which are offset from the axial center (the center in the axial direction) of the iron core rotor 17 on the power feeding plate 11's side. With this, the front end portions of the permanent magnets 14 and 15 are disposed to be overlapped, in the radial direction, with switching brushes 25*a* and 25*b* (described later) which are provided to the commutator 21 and the power feeding plate 11.

Figure 5:
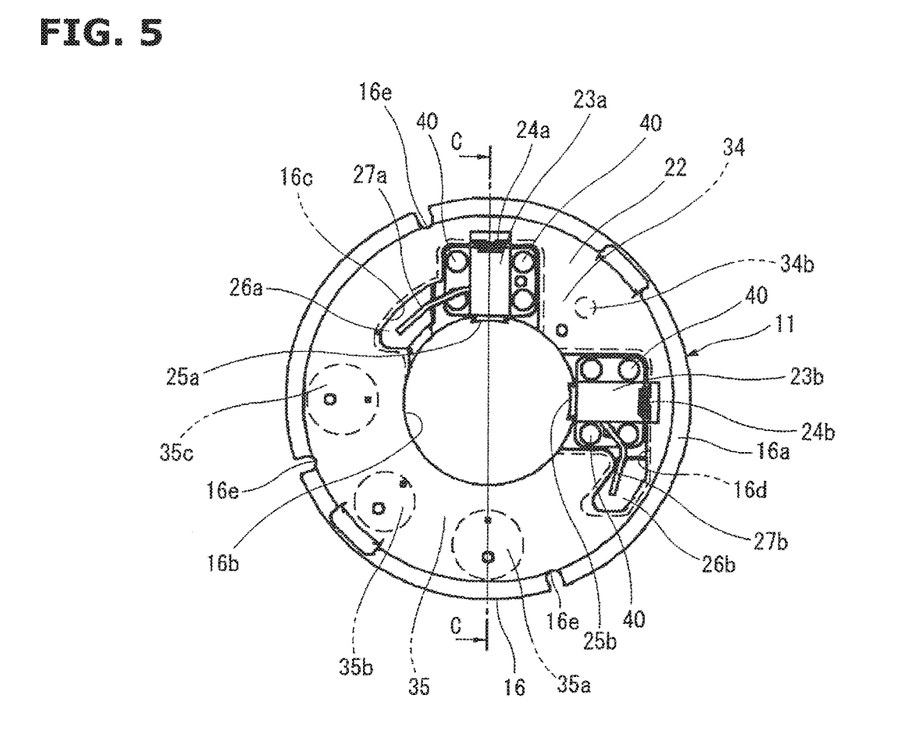
FIG. 5 is a front view showing a power feeding plate in this embodiment.
Figure 6:
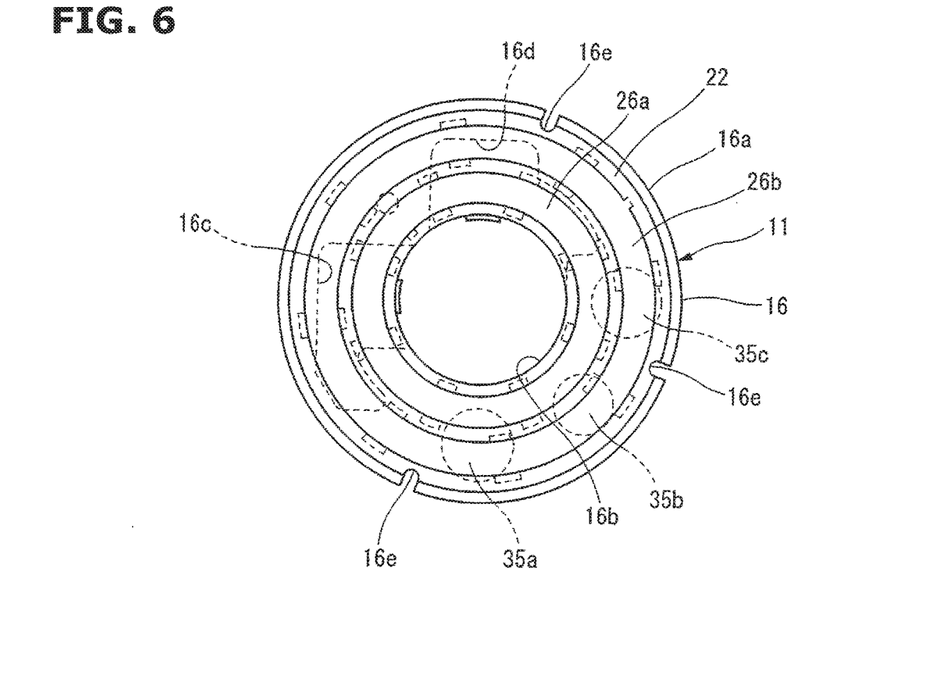
FIG. 6 is a back view showing the power feeding plate.
Figure 7:
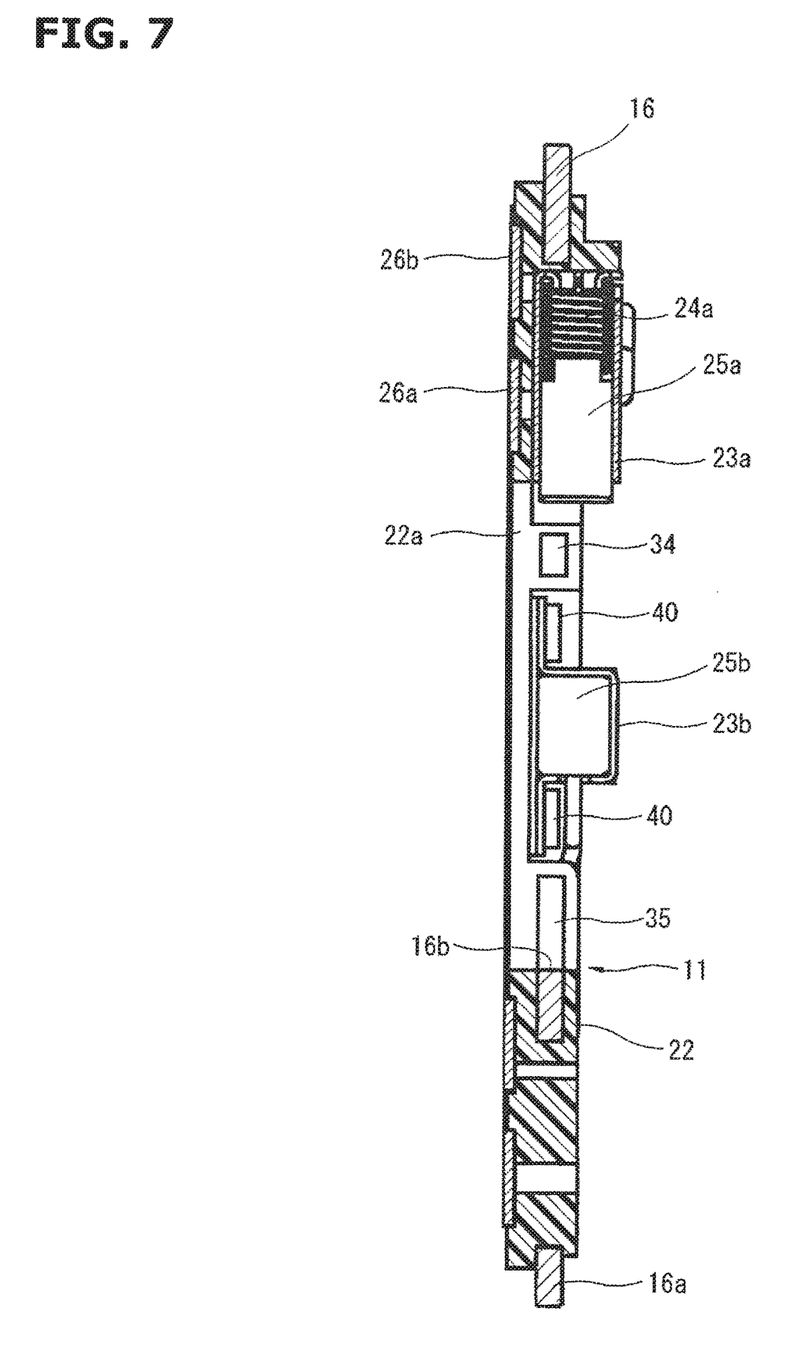
FIG. 7 is a sectional view taken along a section line C-C of FIG. 5.

As shown in FIG. 5 to FIG. 7, the power feeding plate 11 includes a rigid plate portion 16 (fixing plate portion) which is made from metal series material, and which has a substantially disc shape; and a resin portion 22 which has a circular plate shape, and which is molded on front and rear side surfaces of the rigid plate portion 16. Besides, this power feeding plate 11 constitutes a part of the power feeding mechanism to the electric motor 12.

Figure 8:
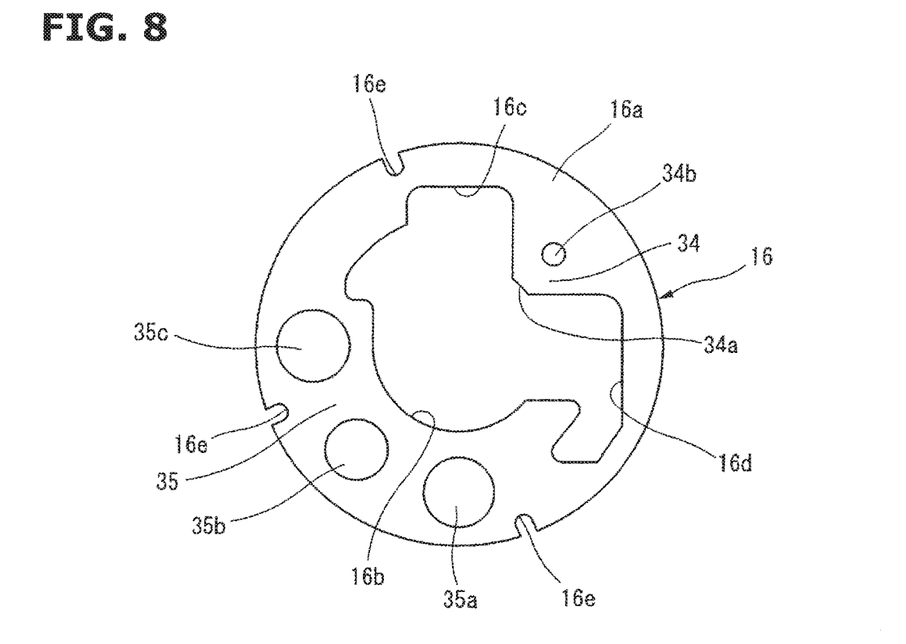
FIG. 8 is a front view showing a rigidity plate portion in this embodiment.

As shown in FIG. 1 and FIG. 8, the rigid plate 16 includes an outer circumference portion 16*a* which is not covered with the resin portion 22, and which is poisoned and fixed in an annular stepped recessed portion 5*e* that is formed on the inner circumference of the front end portion of the motor housing 5 by caulking. Moreover, the rigid plate 16 includes a shaft insertion hole 16*b* which is formed at a central portion of the rigid plate 16, into which one end portion of the motor output shaft 13 and so on is inserted, and which penetrates through the rigid plate 16.

Furthermore, the rigid plate 16 includes two holding holes 16*c* and 16*d* which have different shapes, which are formed, by punching (stamping), on an inner circumference edge of the shaft insertion hole 16*b* at predetermined continuous positions. Brush holders 23*a* and 23*b* (described later) are mounted and held in these holding holes 16*c* and 16*d*. Moreover, the rigid plate 16 includes a reinforcement portion 34 which is integrally formed at a remaining portion after the punching of the holding holes 16*c* and 16*d*, and which has a substantially triangular shape. Furthermore, the rigid plate 16 includes a second reinforcement portion 35 which is integrally formed at a position opposite to the first reinforcement portion 34 with respect to the shaft insertion hole 16*b*.

The first reinforcement portion 34 includes an apex portion 34*a* which confronts the shaft insertion hole 16*b*. The first reinforcement portion 34 include a small diameter hole 34*b* which is located at a central position of the first reinforcement portion 34, and which penetrates through the first reinforcement portion 34.

The second reinforcement portion 35 extends in the form of the arc shape along the inner circumference surface of the shaft insertion hole 16*b*. The second reinforcement portion 35 has an area larger than that of the first reinforcement portion 34. The second reinforcement portion 35 includes three weight balancer holes 35*a*, 35*b*, and 35*c* which are formed at a regular interval in the circumferential direction, and which penetrate through the second reinforcement portion 35.

Besides, the rigidity plate 16 includes three U-shaped grooves 16*e* which are formed on the outer circumference portion 16*a* at predetermined circumferential positions, and which are arranged to position the rigidity plate 16 in the circumferential direction with respect to the housing main body 5*a* through a jig (not shown).

Moreover, as shown in FIG. 5 to FIG. 7, the power feeding plate 11 is provided with a pair of the brush holders 23*a* and 23*b* which are made from a copper, which are disposed, respectively, within the holding holes 16*c* and 16*d* of the rigid plate 16, and which are fixed to the front end portion 22*a* of the resin portion 22 by a plurality of rivets 40; a pair of switching brushes 25*a* and 25*b* which are received within the brush holders 23*a* and 23*b*, which are arranged to be slid in the radial directions, each of which includes an arc tip end surface that is elastically abutted on the outer circumference surface of the commutator 21 from the radial direction by spring forces of coil springs 24*a* and 24*b*, and which are commutators; inner and outer power feeding slip rings 26*a* and 26*b* which have circular shapes, and which are embedded and fixed on the front end portion 22*a*'s side of the resin portion 22 in a state where outer side surfaces of the inner and outer power feeding slip rings 26*a* and 26*b* are exposed; and harnesses 27*a* and 27*b* which electrically connect the switching brushes 25*a* and 25*b* and the slip rings 26*a* and 26*b*. These and the power feeding plate 11 constitute the power feeding mechanism.

A part of the back side surface of each of the slip rings 26*a* and 26*b* is exposed from the resin portion 22. One end portions of the pig tail harnesses 27*a* and 27*b* are connected, respectively, to these exposing portions by soldering.

A holding member 28 is fixed to the cover main body 3*a* of the cover member 3. The holding member 28 is integrally molded by the synthetic resin. As shown in FIG. 1 and FIG. 2, this holding member 28 is formed into a substantially L-shape when viewed from a side. The holding member 28 mainly includes a brush holding portion 28*a* which has a bottomed cylindrical shape, and which is inserted into the holding hole 3*d* of the cover member 3; a connector portion 28*b* located on a side opposite to the brush holding portion 28*a*; a boss portion 28 which is integrally provided to on one end surface of the brush holding portion 28*a* to protrude, and which is fixed to the cover body member 3*a* by bolts; and power feeding terminal strips 31 and 31 whose a portion is embedded in the internal portion.

As shown in FIG. 1 and FIG. 2, the brush holding portion 28*a* includes a pair of rectangular hollow holes which extend in a substantially horizontal direction (the axial direction), and which are formed in parallel with each other at upper and lower portions of the inside space (the radially inside and the radially outside of the axial center of the motor housing 5). Brush holders 29*a* and 29*b* are fixed, respectively in these rectangular hollow holes of the brush holding portion 28*a* by the press-fit. Power feeding brushes 30*a* and 30*b* are held within these brush holder 29*a* and 29*b* to be slid in the axial direction.

Each of the brush holders 29*a* and 29*b* includes opening portions formed on front and rear ends. Tip end portions of the power feeding brushes 30*a* and 30*b* are arranged to be moved from and into the opening portions of the front end side. The one end portions of the pig tail harnesses (not shown) are connected through the opening portions of the rear end side to the rear ends of the power feeding brushes 30*a* and 30*b* by the soldering.

Each of the power feeding brushes 30*a* and 30*b* is formed into the rectangular shape. Each of the power feeding brushes 30*a* and 30*b* has a predetermined axial length. The power feeding brushes 30*a* and 30*b* include flat tip end surfaces which are arranged to be abutted on the power feeding slip rings 26*a* and 26*b* from the axial direction.

A pair of coil springs 42*a* and 42*b* are provided on the rear end sides of the insides of the brush holders 29*a* and 29*b* of the brush holding portion 29. The pair of the coil springs 42*a* and 42*b* are arranged to urge the power feeding brushes 30*a* and 30*b* toward the slip rings 26*a* and 26*b*.

Figure 3:
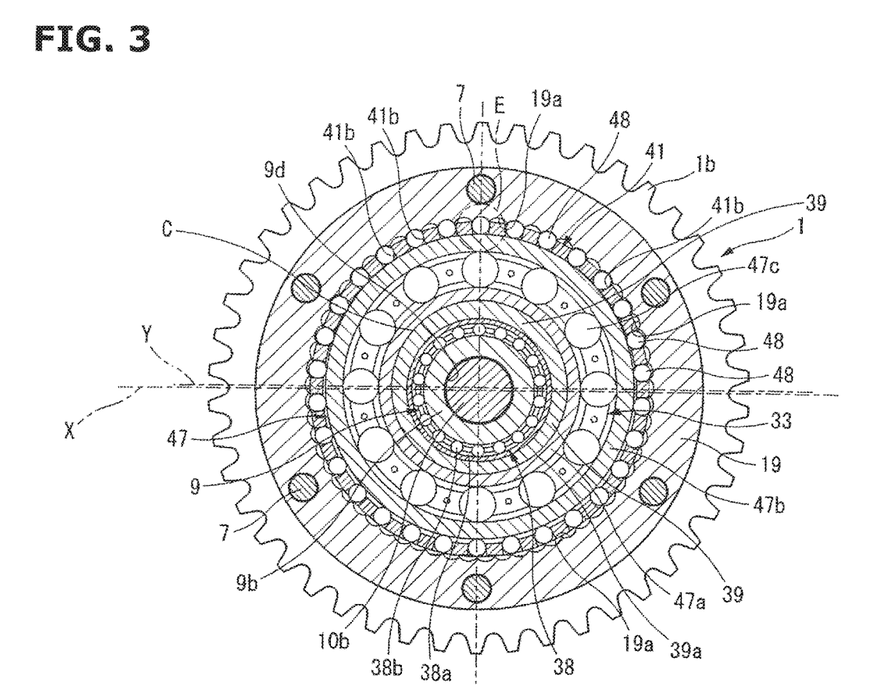
FIG. 3 is a sectional view taken along a section line A-A of FIG. 1.

As shown in FIG. 3, the pair of the power feeding terminal strips 31*a* and 31*b* extend in parallel with each other in the upward and downward directions. Each of the power feeding end terminal strips 31*a* and 31*b* has a substantially crank shape. Terminals 31*a* and 31*a* on one side (lower end side) are disposed in an exposed state. Terminals 31*b* and 31*b* on the other side (the upper end side) are provided within female type mounting grooves 28*d* of the connecter portion 28*b* to protrude.

The terminals 31*a* and 31*a* of the one side are disposed to be abutted on the upper surfaces of the bottom wall 28*f*. The other end portions of the pair of the pig tail harnesses (not shown) are connected to the terminals of the one side by the soldering.

As described above, each of the pig tail harnesses has a length set so that the power feeding brushes 30*a* and 30*b* are not dropped from the brush holders 29*a* and 29*b* even when the power feeding brushes 30*a* and 30*b* are pushed by the spring forces of the coil springs 42*a* and 42*b*.

As shown in FIG. 1, an annular seal member 33 is mounted and held in the annular mounting groove formed in the outer circumference of the brush holding portion 28*a* on the base end side.

In the connector portion 28*b*, the other end side terminals 31*b* and 31*b* confronting the above-described mounting groove 28*d* having the upper end portion into which the male type terminal (not shown) is inserted is connected through the male type terminal to the control unit (not shown).

The motor output shaft 13 and the eccentric shaft portion 39 are rotatably supported by the small diameter ball bearing 37 and the needle bearing 38. The small diameter ball bearing 37 is provided on the outer circumference surface of the shaft portion 10*b* of the cam bolt 10. The needle bearing 38 is disposed on the outer circumference surface of the cylindrical portion 9*b* of the driven member 9, and disposed on the axial side portion of the small diameter ball bearing 37.

The needle bearing 38 includes a cylindrical retainer 38*a* which is press-fit in the inner circumference surface of the eccentric shaft portion 39; and needle rollers 38*b* which are a plurality of rolling members that are rotatably held within the retainer 38*a*. These needle rollers 38*b* are rolled on the outer circumference surface of the cylindrical portion 9*b* of the driven member 9.

The small diameter ball bearing 37 includes an inner wheel which is sandwiched and fixed between the front end edge of the cylindrical portion 9*b* of the driven member 9 and the head portion 10*a* of the cam bolt 10; and an outer wheel which is fixed in the inner circumference surface of the eccentric shaft portion 39 which has the diameter-increased stepped shape by the press-fit, and which is abutted on the stepped edge formed on the inner circumference surface to be positioned in the axial direction.

A small diameter oil seal 46 is provided between the outer circumference surface of the motor output shaft 13 (the eccentric shaft portion 39) and the inner circumference surface of the extension portion 5*d* of the motor housing 5. The small diameter oil seal 46 is arranged to prevent the leakage of the lubricant from the inside of the speed reduction mechanism 8 to the inside of the electric motor 12. This oil seal 46 separates the electric motor 12 and the speed reduction mechanism 8 by the sealing function.

The control unit is arranged to sense a current driving state of the engine based on information signals from various sensors such as a crank angle sensor (not shown), an air flow meter (not shown), a water temperature sensor, and an accelerator opening degree sensor, and to perform the engine control based on these information signals. Moreover, the control unit is configured to perform rotation control of the motor output shaft 13 by energizing the coil 18 through the power feeding brushes 30*a* and 30*b*, the slip rings 26*a* and 26*b*, the switching brushes 25*a* and 25*b*, the commutator 21 and so on, and to control a relative rotational phase of the cam shaft 2 with respect to the timing sprocket 1 by the speed reduction mechanism 8.

As shown in FIG. 1 to FIG. 3, the speed reduction mechanism 8 includes the eccentric shaft portion 39 arranged to perform the eccentric rotation movement (to rotate in an eccentric state); a middle diameter ball bearing 47 which is provided on the outer circumference surface of the eccentric shaft portion 39; the rollers 48 which are provided on the outer circumference of the middle diameter ball bearing 47; the holding device 41 which is arranged to allow the movement of the rollers 48 in the radial direction while holding the rollers 48 in the rolling direction; and the driven member 9 which is integral with the holding device 41.

The eccentric shaft portion 39 includes a cam surface 39a formed on the outer circumference surface of the eccentric shaft portion 39. The cam surface 39a of the eccentric shaft portion 39 has a center axis Y which is slightly eccentric from a center axis X of the motor output shaft 13 in the radial direction.

The entire of the middle diameter ball bearing 47 is disposed to be substantially overlapped with the needle bearing 38 in the radial direction. The middle diameter ball bearing 47 includes an inner wheel 47a; an outer wheel 47b; and balls 47c disposed between the inner and outer wheels 47a and 47b. The inner wheel 47a is fixed on the outer circumference surface of the eccentric shaft portion 39 by the press-fit. The outer wheel 47b is not fixed in the axial direction so as to be a free state. That is, this outer wheel 47b includes a first end surface which is on the electric motor 8's side, and which is not abutted on any portions; and a second axial end surface which is disposed with a minute first clearance C between the second axial end surface and the inner side surface of the holding device 41 which confronts the second axial end surface. With this, the outer wheel 47b is in the free state. Moreover, the outer circumference surfaces of the rollers 48 are abutted on the outer circumference surface of the outer wheel 47b to be rolled on the outer circumference surface of the outer wheel 47b. An annular second clearance C1 is formed on the outer circumference side of the outer wheel 47b. The entire of the middle diameter ball bearing 47 is arranged to be moved in the radial direction by this second clearance C1 in accordance with the eccentric rotation of the eccentric shaft portion 39, that is, to perform the eccentric movement.

The rollers 48 are made from the iron series metal. The rollers 48 are arranged to be moved in the radial directions in accordance with the eccentric movement of the middle diameter ball bearing 47, and thereby to be inserted and mounted in the internal teeth 19a of the internal teeth constituting section 19. The rollers 48 are arranged to be pivoted in the radial direction while being guided in the circumferential direction by the both side edges of the roller holding holes 41b of the holding device 41.

A lubricant supply section is arranged to supply the lubricant to the inside of the speed reduction mechanism 8. This lubricant supply section includes an oil supply passage which is formed within the bearing 02 of the cylinder head 01, and to which the lubricant is supplied from a main oil gallery (not shown); an oil supply hole 51 which is formed in the cam shaft 2 in the axial direction, and which is connected to the oil supply passage through a groove; an oil hole 52 which has a small diameter, which is formed inside the driven member 9 to penetrate in the axial direction, and which includes a first end opened to the oil supply hole 51, and a second end opened to a portion near the needle bearing 38 and the middle diameter ball bearing 47; and an oil discharge hole (not shown) which is similarly formed in the driven member 9 to penetrate through the driven member 9.

This lubrication oil supply section is arranged to supply the lubrication oil into the receiving space 44, so that the lubrication oil is stored in the receiving space 44. The lubrication oil from the receiving space 44 lubricates the middle diameter ball bearing 47 and the rollers 48. Moreover, the lubrication oil flows into the inside of the motor output shaft 13, so as to lubricate the movable section such as the needle bearing 38 and the small diameter ball bearing 37. Besides, the small diameter oil seal 44 suppresses the leakage of the lubricating oil retained within the receiving space 44 into the motor housing 5.

Operations of this Embodiment

Hereinafter, operations of this embodiment are illustrated. Firstly, the timing sprocket 1 is rotated through the timing chain in accordance with the rotation of the crank shaft of the engine. This rotational force is transmitted through the internal teeth constituting section 19 and the internal screw constituting section 6 to the motor housing 5. With this, the motor housing 5 is synchronously rotated. On the other hand, the rotational force of the internal teeth constituting section 19 is transmitted from the rollers 48 through the holding device 41 and the driven member 9 to the cam shaft 2. With this, the cams of the cam shaft 2 open and close the intake valves.

Then, in a predetermined driving state of the engine after the start of the engine, the current is applied to the coil 18 of the electric motor 12 from the control unit through the terminal strips 31 and 31, the pigtail harnesses, the power feeding brushes 30a and 30b, the slip rings 26a and 26b, and so on. With this, the motor output shaft 13 is rotated in the positive direction and in the negative direction. The speed of this rotational force is reduced by the speed reduction mechanism 8. This speed-reduced rotational force is transmitted to the cam shaft 2.

That is, when the eccentric shaft portion 39 is rotated to be eccentric in accordance with the rotation of the motor output shaft 13, each of the rollers 48 is got over one of the internal teeth 19a of the internal teeth constituting section 19 while being guided by the corresponding one of the roller holding holes 41b of the holding device 41 in the radial direction, at each one rotation of the motor output shaft 13. The each of the rollers 48 is rolled and moved to adjacent one of the internal teeth 19a. This movement of the each of the rollers 48 is repeated, so as to be rolled in the circumferential direction in the abutted state. The speed of the rotation of the motor output shaft 13 is reduced by this rolling movement of these rollers 48 in the abutted state. This speed-reduced rotational force is transmitted to the driven member 9. In this case, this speed reduction ratio can be arbitrarily set by a number of a difference between a number of the internal teeth 19a and a number of the rollers 48.

With this, the cam shaft 2 is relatively rotated in the positive direction or in the reverse direction relative to the timing sprocket 1, so as to convert the relative rotational phase. The opening or closing timing of the intake valve is controlled to be converted to the advance angle side or the retard angle side.

Each of the side surfaces of the stopper raised portion 61b is arranged to be abutted on one of the corresponding confronting surfaces 2c and 2d of the stopper recessed groove 2b, so as to restrict a maximum position of the positive and negative relative rotations of the cam shaft 2 with respect to the timing sprocket 1.

Accordingly, the opening or closing timing of the intake valve is converted to the maximum degree on the advance angle side or the retard angle side. Consequently, it is possible to improve the fuel economy (consumption) of the engine and the output of the engine.

In this embodiment, when the rigid plate portion 16 is fixed to the front end side opening portion of the housing main body 5a, first, the outer circumference portion 16a of the rigidity plate portion 16a is fit in the stepped recessed groove 5e from the axial direction. Then, the outer circumference portion of the stepped recessed groove 5e is fixed to the inside by the caulking. The rigidity plate portion 16 is not the simple annular shape. The rigidity plate portion 16 has the first reinforcement portion 34 and the second reinforcement portion 35 which are positioned on the inner circumference portion. Accordingly, the entire of the rigidity plate portion 16 has the high rigidity. Consequently, this rigidity plate portion 16 is not deflected and deformed by the load stress at the caulking. The entire of the power feeding plate 11 including the resin portion 22 is maintained to the flat shape. Therefore, it is possible to suppress the decrease of the flatness of each of the slip rings 26a and 26b integrally fixed to the resin portion 22, and to constantly obtain the smooth slidability with the power feeding brushes 30a and 30b.

In particular, there are provided two reinforcement portions 34 and 35. These reinforcement portions 34 and 35 are disposed to confront each other in the radial direction. Accordingly, it is possible to increase the reinforcement effect of the rigidity plate portion 16.

Moreover, the first reinforcement portion 34 and the second reinforcement portion 35 are disposed so that a part of the first reinforcement portion 34 and a part of the second reinforcement portion 35 are overlapped with the slip rings 26a and 26b in the axial direction. Accordingly, the support rigidity of the slip rings 26a and 26b by the resin portion 22 becomes high. With this, it is also possible to increase the flatness of the slip rings 26a and 26b.

Moreover, the brush holders 23a and 23b of the switching brushes 25a and 25b are fixed to the resin portion 22 in a state where the brush holders 23a and 23b are disposed within the holding holes 16c and 16d which are formed in the rigid plate portion 16. That is, the brush holders 23a and 23b are disposed and fixed at a substantially central portion of the rigid plate portion 16 in the axial direction. Accordingly, it is possible to decrease the axial length of the power feeding mechanism as much as possible. Consequently, it is possible to decrease the axial length of the valve timing control apparatus.

Furthermore, in the power feeding plate 11, the outer circumference portion 16a of the rigidity plate portion 16 is fixed to the front end opening portion of the housing main body 5a by the caulking, as described above. Accordingly, it is possible to decrease the number of the components, and to ease the assembly operation, relative to, for example, a case where the power feeding plate 11 is fixed by using the slip rings.

Moreover, in the power feeding plate 11, the parts of the slip rings 26a and 26b are exposed from the resin portion 22. The one end portions of the pig tail harnesses 27a and 27b are connected to the exposed portions by the soldering. Accordingly, it is possible to simplify the connection structure, and to ease the connection operation.

In this embodiment, the holding holes 16c and 16d are provided on the one side of the rigidity plate 16 in the radial direction for fixing the brush holders 23a and 23b and the switching brushes 25a and 25b by the resin portion 22. Accordingly, the entire weight balance may be deteriorated. However, three weight balance holes 35a to 35c are formed at positions of the second reinforcement portion 35 which is oppose to (confronts) the brush holders 23a and 23b and the switching brushes 25a and 25b in the radial direction. Consequently, it is possible to improve the entire weight balance.

The resin portion 22 is integrally molded on the front and rear surface sides of the rigidity plate portion 16, except for the outer circumference portion 16a. The slip rings 26a and 26b and the brush holders 23a and 23b are integrally molded and fixed on this resin portion 22. Accordingly, it is possible to ease the respective fixing operation.

The resin of the resin portion 22 is also filled within the holding holes 16c and 16d and the weight balance holes 35a to 35c. Accordingly, it is possible to use to prevent the rotation at the positioning in the circumferential direction when the rigidity plate portion 16 is fixed to the housing main body 5a.

By exposing the outer circumference portion 16a of the rigidity plate portion 16, it is possible to ensure the caulking force. Moreover, it is possible to radiate the heat generated at the sliding movement between the power feeding brushes 30a and 30b and the slip rings 26a and 26b, from the outer circumference portion 16a.

Moreover, in this embodiment, the U-shaped groove 16e provided in the outer circumference portion 16a of the rigidity plate portion 16 is used as a mark (sign) for positioning in the circumferential direction with respect to the housing main body 5a at the caulking fixation. Moreover, the U-shaped groove 16e can be used for the validation test of the slip torque of the power feeding plate 11 with respect to the housing main body 5a by inserting and engaging the jig after the caulking fixation.

Second Embodiment

Figure 9:
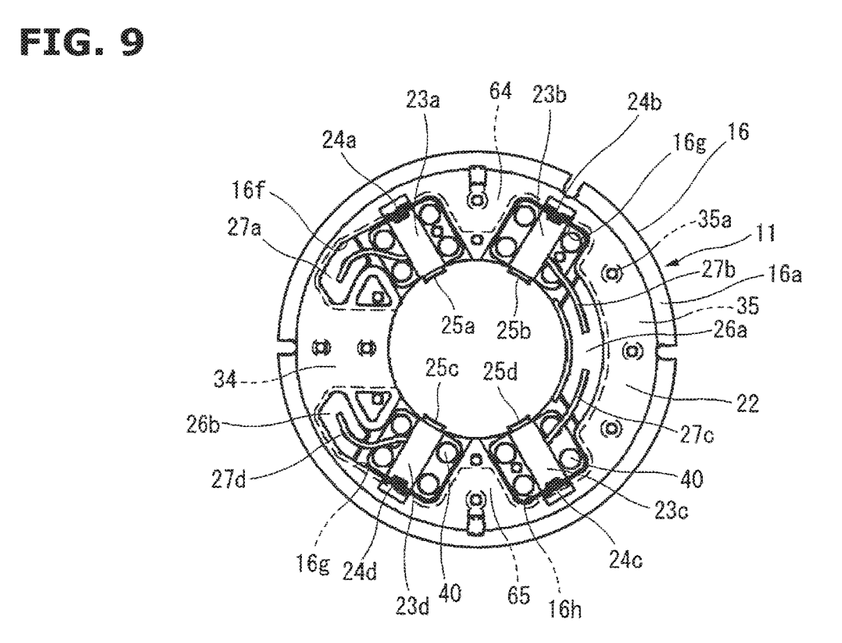
FIG. 9 is a front view showing a power feeding plate in a second embodiment.

FIG. 9 shows a second embodiment. A basic structure of the second embodiment is identical to that of the first embodiment. Different portions are to provide the four switching brushes to the power feeding plate 11.

Figure 10:
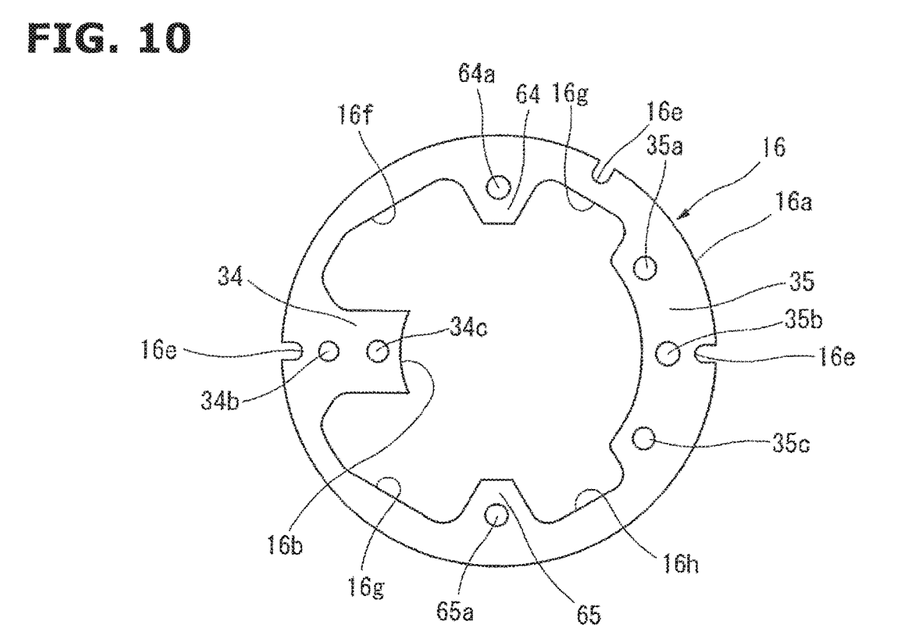
FIG. 10 is a back view showing the power feeding plate.

That is, as shown in FIG. 10, the rigidity plate portion 16 of the power feeding plate 11 includes four holding holes 16f to 16i which have different shapes, and which are located at radial positions around the axial insertion hole 16b of the center. A first reinforcement portion 34 is provided between two holding holes 16f and 16i which are adjacent to each other in the circumferential direction. The first reinforcement portion 34 has a substantially rectangular shape, and protrudes in the inside direction. Moreover, an arc second reinforcement portion 35 is provided at a position confronting (oppose to) the first reinforcement portion 34 in the radial direction. Furthermore, third and fourth reinforcement portions 64 and 65 are provided between the first reinforcement portion 34 and the second reinforcement portion 35 in the circumferential direction. Each of the third and fourth reinforcement portions 64 and 65 has a trapezoid shape, and is provided to protrude in the inside direction.

The reinforcement portions 34, 35, 64, and 65 include, respectively, the weight balance holes 34b, 34c, 35a to 35c, and 64a, and 65a.

As shown in FIG. 9, the resin portion 22 is molded on the both side surfaces of the rigidity plate portion 16, that is, the both side surfaces including the holding holes 16f to 16i, and the reinforcement portions 34, 35, 64, and 65. The four brush holders 23a to 23d are integrally provided at the positions of the resin portion 22 which corresponds to the holding 16f to 16i by the rivets 40 of the both side portions. Moreover, the switching brushes 25a to 25d are urged within the brush holders 23a to 23d by the coil springs 24a to 24d in a direction to be moved from the brush holders 23a to 23d in the forward direction. The tip end portions of the switching brushes 25a to 25d are abutted on the outer circumference surface of the commutator 21.

Moreover, the slip rings 26a and 26b are embedded and fixed in the front end portion of the resin portion 22. The one end portions of the pig tail harnesses 27a to 27d are connected to the part of the back surface side which is exposed from the resin portion 22 by the soldering, like the first embodiment.

Accordingly, in the second embodiment, the four switching brushes 25a to 25d are abutted on the outer circumference surface of the commutator 21. Accordingly, it is possible to further improve the conductivity from the slip rings 26a and 26b to the commutator 21.

The rigidity of the rigidity plate portion 16 is ensured by the reinforcement portions 34, 35, 64, and 65. Accordingly, it is possible to suppress the deflection deformation at the caulking fixation, and to suppress the decrease of the flatness of the slip rings 26a and 26b, like the first embodiment.

The present invention is not limited to the embodiments. It is possible to obtain the effects as long as the load is applied to the outer circumference portion 16a of the rigidity plate portion 16. For example, the fixing means of the rigidity plate portion 16 to the housing main body 5a may be the press-fit, and the fixation by the bolts, in addition to the caulking. In case of these press-fit and bolt fixation, the load applied to the rigidity plate portion 16 at the press fit and the bolt fixation is large. Accordingly, the above-described artificial problems may be caused. However, it is possible to ensure the rigidity by the effects of the above-described embodiments, and to suppress the deflection deformation.

Moreover, the rigidity plate portion 16 is not limited to the iron series metal. For example, the rigidity plate portion 16 may be a plate made from the resin material having rigidity larger than that of the resin portion 22.

Furthermore, the number of the power feeding brushes may be three or five, in addition to two and four. In this case, the weight balance is adjusted by arbitrarily forming the weight balance holes.

Technical ideas of the present invention which are understood the above-described embodiments except for the claims are explained below.

[Claim A]

The valve timing control device for the internal combustion engine as claimed in claim 5, wherein at least two switching brushes are provided to the power feeding plate in the circumferential direction; and the reinforcement portion of the rigidity plate portion is disposed between the both switching brushes.

By this invention, it is possible to improve the rigidity of the portion around the both switching brushes by the reinforcement portion, and to effectively radiate generated in the switching brushes from the reinforcement portion.

[Claim B]

The valve timing control device for the internal combustion engine as claimed in claim 7, wherein the resin portion is not provided at the outer circumference portion of the rigidity plate portion which is fixed by the caulking.

The portion at which the resin portion is not provided is caulked. Accordingly, it is possible to increase the strength of the caulking.

The invention claimed is:

1. A valve timing control device for an internal combustion engine comprising:
    a driving rotation member including a sprocket to which a rotational force is transmitted from a crank shaft;
    a driven rotation member including a cylindrical holder, the driven rotational member being fixed to a cam shaft to which the rotational force is transmitted from the driving rotation member;
    an electric motor provided to the driving rotation member;
    a speed reduction mechanism including a rotatable shaft, the speed reduction mechanism being configured to reduce a speed of a rotation of a motor output shaft, and to transmit the rotation to the driving rotation member;
    a power feeding brush configured to feed current supplied from a power feeding circuit, to the electric motor; and
    a power feeding plate which is provided to the driving rotation member, and which includes a slip ring on which the power feeding brush is abutted,
    the power feeding plate being formed into a disc shape, the power feeding plate including a rigidity plate portion whose outer circumference portion is fixed to the driving rotation member, and a resin portion formed by molding an outer surface of the rigidity plate portion, and
    the rigidity plate portion having a rigidity greater than a rigidity of the resin portion, the rigidity plate portion including a holding hole which holds the power feeding brush through the resin portion, the rigidity plate portion being integrally formed with a reinforcement portion which is formed at a portion other than the holding hole, and which extends in a radially inward direction.

2. The valve timing control device for the internal combustion engine as claimed in claim 1, wherein the resin portion is molded on side surfaces of the rigidity plate portion; and the resin portion is configured to hold the slip ring on an outer side surface of the resin portion.

3. The valve timing control device for the internal combustion engine as claimed in claim 2, wherein a part of the reinforcement portion of the rigidity plate portion is disposed to be overlapped with the slip ring in an axial direction.

4. The valve timing control device for the internal combustion engine as claimed in claim 3, wherein the slip ring is positioned on the outer side surface side of the resin portion; a surface of the slip ring on which the power feeding brush is abutted is exposed; the resin portion includes an exposing portion in which a part of a back surface of the slip ring is exposed; and one end portion of a harness which is connected to a coil of the electric motor is connected to the exposing portion.

5. The valve timing control device for the internal combustion engine as claimed in claim 4, wherein a commutator is provided on an outer circumference of the motor output shaft of the electric motor; a switching brush which is electrically connected to the back surface of the slip ring is disposed within the holding hole of the rigidity plate portion; and a tip end portion of the switching brush is abutted and slid on an outer circumference surface of the commutator to energize the coil of the electric motor.

6. The valve timing control device for the internal combustion engine as claimed in claim 4, wherein two slip rings are disposed on a radial inside, and on a radial outside of a motor housing, and the reinforcement portion is disposed to be overlapped with the two slip rings in an axial direction of the output shaft.

7. The valve timing control device for the internal combustion engine as claimed in claim 1, wherein a fixation of the rigidity plate portion is a caulking fixation to the driving rotation member, a press-fit fixation to the driving rotation member, or a bolt fixation to the driving rotation member.

8. The valve timing control device for the internal combustion engine as claimed in claim 1, wherein the rigidity plate portion includes a second reinforcement portion which is located at a position which is opposed to the reinforcement portion in a radial direction, and which extends in an inside direction.

9. The valve timing control device for the internal combustion engine as claimed in claim 8, wherein the second reinforcement portion has a circumferential width larger than a circumferential width of the reinforcement portion; and a balance hole is formed at a position which is opposed to the reinforcement portion in the radial direction.

10. The valve timing control device for the internal combustion engine as claimed in claim 9, wherein the balance hole is covered with the resin portion formed on side surfaces of the rigidity plate portion.

11. The valve timing control device for the internal combustion engine as claimed in claim 8, wherein the second reinforcement portion has a circumferential width larger than a circumferential width of the reinforcement portion; and the second reinforcement portion has a radial width shorter than a radial width of the reinforcement portion.

12. The valve timing control device for the internal combustion engine as claimed in claim 1, wherein the rigidity plate portion is made from iron series metal.

13. The valve timing control device for the internal combustion engine as claimed in claim 1, wherein an annular recessed groove having a substantially L-shaped traverse cross section is formed at an axial one end portion of the driving rotation member; an outer circumference portion of the rigidity plate portion is abutted on a bottom surface of the annular recessed groove from an axial direction; and a portion comprising the annular recessed groove of the one end portion is caulked to fix the rigidity plate portion.

14. The valve timing control device for the internal combustion engine as claimed in claim 1, wherein the resin portion of the power feeding plate is provided apart from an inner circumference surface of the driving rotation member.

15. The valve timing control device for the internal combustion engine as claimed in claim 1, wherein the rigidity plate portion includes at least one cutaway portion formed on the outer circumference portion.

16. The valve timing control device for the internal combustion engine as claimed in claim 15, wherein the cutaway portion is exposed to an outside even in a state where the rigidity plate portion is caulked on one end portion of the driving rotation member.

17. A valve timing control device for an internal combustion engine comprising:
a driving rotation member including a sprocket and to which a rotational force is transmitted from a crank shaft;
a driven rotation member including a cylindrical holder, the driven rotation member being fixed to a cam shaft to which the rotational force is transmitted from the driving rotation member;
an electric motor provided to the driving rotation member;
a speed reduction mechanism including a rotatable shaft and being configured to reduce a speed of a rotation of a motor output shaft, and to transmit the rotation to the driving rotation member;
at least one power feeding brush configured to feed current supplied from a power feeding circuit, to the electric motor; and
a power feeding plate which is provided to the driving rotation member, and which includes a slip ring on which the at least one power feeding brush is abutted,
the power feeding plate including a fixed plate portion which has a disc shape, and which includes an outer circumference portion that is fixed to the driving rotation member by caulking or press-fit, and a resin portion which is formed by molding on side surfaces of the fixed plate portion,
the fixed plate portion including a shaft insertion hole into which one end portion of the motor output shaft is inserted, at least two penetrating portions which hold the at least one power feeding brush through the resin portion, and which is connected to the shaft insertion hole, and a reinforcement portion which extends in a radially inward direction between the at least two penetrating portions in a circumferential direction of the fixed plate portion, and
the resin portion being molded on the side surfaces of the fixed plate portion including the at least two penetrating portions, and the slip ring being held on an outer side surface of the resin portion.

18. The valve timing control device for the internal combustion engine as claimed in claim 17, wherein the power feeding plate includes an exposing portion in which a part of a back surface side of the slip ring is exposed through an opening portion formed at a portion of another side with respect to the outer side surface; a switching brush which is electrically connected to the exposing portion by a pig tail harness is disposed in the power feeding plate; and a tip end portion of the switching brush is slid and abutted on an outer circumference surface of a commutator provided to the motor output shaft of the electric motor to energize a coil of the electric motor.

19. The valve timing control device for the internal combustion engine as claimed in claim 18, wherein the exposing portion is exposed to an outside through the at least two penetrating portions of the fixed plate portion and the opening portion of the resin portion.

* * * * *